US005663272A

United States Patent [19]

Slack et al.

[11] Patent Number: 5,663,272
[45] Date of Patent: Sep. 2, 1997

[54] ALLOPHANATE-MODIFIED DIPHENYLMETHANE DIISOCYANATES AND PROCESSES FOR THEIR PRODUCTION AND USE

[75] Inventors: William E. Slack, Moundsville, W. Va.; Edmund J. Madaj, Imperial; David D. Steppan, Gibsonia, both of Pa.

[73] Assignee: Bayer Corporation, Pittsburgh, Pa.

[21] Appl. No.: 577,580

[22] Filed: Dec. 22, 1995

[51] Int. Cl.$^6$ .................................................. C08G 18/71
[52] U.S. Cl. ............................. 528/69; 528/54; 528/64; 560/27; 252/182.2; 252/182.22
[58] Field of Search ........................ 528/69, 56, 64; 560/27; 252/182.2, 182.22

[56] References Cited

U.S. PATENT DOCUMENTS

| | | | |
|---|---|---|---|
| 3,644,457 | 2/1972 | König et al. | 260/453 SP |
| 4,055,548 | 10/1977 | Carleton et al. | 260/77.5 AT |
| 4,115,429 | 9/1978 | Reiff et al. | 260/453 SP |
| 4,118,411 | 10/1978 | Reiff et al. | 260/453 SP |
| 4,160,080 | 7/1979 | Köenig et al. | 528/59 |
| 4,261,852 | 4/1981 | Carroll et al. | 528/59 |
| 4,490,300 | 12/1984 | Allen et al. | 260/453 SP |
| 4,738,991 | 4/1988 | Narayan | 521/124 |
| 4,810,820 | 3/1989 | Slack et al. | 560/27 |
| 4,866,103 | 9/1989 | Cassidy et al. | 521/159 |
| 5,319,054 | 6/1994 | Slack et al. | 528/48 |

FOREIGN PATENT DOCUMENTS

| | | |
|---|---|---|
| 31650 | 7/1981 | European Pat. Off. . |
| 71-99176 | 9/1973 | Japan . |
| 994890 | 6/1965 | United Kingdom . |

Primary Examiner—Joseph Conrad
Attorney, Agent, or Firm—Joseph C. Gil; Lyndanne M. Whalen

[57] ABSTRACT

Allophanate-modified MDI which is a storage stable liquid at 25° C. is produced by reacting a monoisocyanate and an organic material having at least two hydroxyl groups and a molecular weight of from about 60 to about 6,000 to form a urethane. The urethane is then reacted with and isomeric mixture of MDI in an amount such that the product isocyanate will have an NCO content of from about 12 to about 30%. The isomeric mixture of MDI is composed of 4,4'-diphenylmethane diisocyanate containing from 0 to about 60% by weight 2,4'-MDI and less than 6% by weight of the 2,2'-MDI. This allophanate-modified MDI is further reacted with an organic isocyanate-reactive material to produce an allophanate-modified MDI prepolymer containing urethane, urea and/or biuret groups having an NCO content which is generally from about 5 to about 29% by weight. The prepolymers of this invention are particularly useful in reaction injection molding processes because they give molded articles having improved flex modulus.

13 Claims, No Drawings

ALLOPHANATE-MODIFIED DIPHENYLMETHANE DIISOCYANATES AND PROCESSES FOR THEIR PRODUCTION AND USE

BACKGROUND OF THE INVENTION

The present invention relates to liquid, allophanate-modified, diphenylmethane diisocyanates (MDI) and to processes for their production and use.

Liquid diphenylmethane diisocyanates are generally known in the art. U.S. Pat. No. 3,644,457, for example, discloses room temperature, stable, liquid isocyanates derived from one mole of diphenylmethane diisocyanate and 0.1 to 0.3 moles of poly-1,2-propylene ether glycol.

U.S. Pat. No. 4,055,548 discloses liquid isocyanate prepolymer compositions obtained by reacting polymethylene polyphenyl-isocyanate containing from about 65 to 85 percent by weight of methylene bis-phenylisocyanate with a polyoxyethylene glycol having molecular weight of from 200 to 600 in an equivalent ratio 0.0185–0.15:1.

U.S. Pat. Nos. 4,115,429 and 4,118,411 disclose low temperature (i.e., down to −5° C.), storage stable liquid diphenylmethane diisocyanates which are produced by reacting diphenylmethane diisocyanates having a specified 2,4-isomer content with propylene glycol or poly-1,2-propylene ether glycol.

U.S. Pat. No. 4,261,852 discloses liquid polyisocyanate compositions made up of 50 to 90% by weight of a reaction product of diphenylmethane diisocyanate and a. polyoxypropylene diol or triol (hydroxyl equivalent weight of from 750 to 3000) having an NCO content of from 8 to 26% by weight, from about 10 to 50% by weight of a diphenylmethane diisocyanate containing from 30 to 65% by weight of diphenylmethane diisocyanate, the remainder being polymethylene polyphenyl polyisocyanate.

U.S. Pat. No. 4,490,300 discloses room temperature stable, liquid isocyanates made by reacting diphenylmethane diisocyanate with an aliphatic diol having a pendant aromatic group (e.g., 2-methyl-2-phenyl-1,3-propanediol or phenyl-1,2-ethanediol).

U.S. Pat. No. 4,738,991 discloses organic polyisocyanates characterized by allophanate linkages which are prepared by reacting an organic polyisocyanate including 2,4- and 4,4-methylenediphenyl diisocyanate with poly- or monohydric alcohol in the presence of an organo metallic catalyst. The catalyst is deactivated upon completion of the reaction using a compound such as an inorganic acid, organic acid, organic chloroformate or an organic acid chloride.

U.S. Pat. No. 4,866,103 discloses a polyisocyanate composition useful for producing elastomers in a RIM (reaction injection molding) process. These polyisocyanate compositions are the reaction product of an alcohol and/or thiol (average functionality of from about 1.5 to about 4 and average equivalent weight of at least 500) with at least 2 equivalents per hydroxyl, and/or thiol equivalent of an organic polyisocyanate (including 4,4- and 2,4-isomers of diphenylmethane diisocyanate) under conditions such that at least about 20% of the initially formed urethane and/or thiourethane groups are converted to allophanate and/or thioallophanate groups.

Other prior art relating to the preparation of allophanates which contain isocyanates includes British Patent 994,890. This patent discloses reaction of urethane isocyanates with excess diisocyanate either by application of heat alone or by heating in the presence of a catalyst such as a metal carboxylate, a metal chelate or a tertiary amine, until the isocyanate content is reduced to the theoretical level (i.e., that which is obtained theoretically when complete reaction of the urethane groups is achieved).

U.S. Pat. No. 4,160,080 discloses a process for producing allophanates containing aliphatically and/or cycloaliphatically bound isocyanate groups. In the disclosed process, compounds containing urethane groups are reacted with polyisocyanates having aliphatic and/or cycloaliphatic isocyanate groups in the presence of a strong acid. The process is generally conducted at a temperature of from 90° C. to 140° C. for about 4 to 20 hours.

U.S. Pat. No. 4,810,820 discloses a process for the production of polyisocyanates containing allophanate groups in which an aliphatic and/or cycloaliphatic isocyanate is reacted with a hydroxy compound at a temperature of at least 150° C. for no more than 90 minutes.

Japanese Patent Application No. 1971-99176 discloses a method for preparing liquid diphenylmethane diisocyanate by reacting diphenylmethane diisocyanate with aliphatic monovalent alcohol.

U.S. Pat. No. 5,319,054 discloses a process for the production of liquid methylene diphenyl diisocyanates in which one equivalent of a diisocyanate is reacted with one equivalent of an aliphatic alcohol to form a urethane. The urethane is then reacted with an isomeric mixture of diphenylmethane diisocyanate in an amount sufficient to generate an allophanate having an isocyanate group content of from about 12 to about 30%.

EP 31,650 discloses a method for producing liquid polyisocyanates in which diphenylmethane diisocyanate containing at least 15% by weight of the 2,4'-isomer is reacted with a monohydric alcohol corresponding to a specified formula in amounts such that from 0.01 to 0.8 moles of alcohol are present for each mole of diisocyanate.

SUMMARY OF THE INVENTION

It is an object of the present invention to provide a process for the production of isocyanate-terminated prepolymers from allophanate-modified diphenylmethane diisocyanate.

It also an object of the present invention to provide isocyanate-terminated prepolymers of diphenylmethane diisocyanate which has been modified with allophanate groups.

It is another object of the present invention to provide RIM elastomers having improved flex modulus and a process for their production.

These and other objects which will be apparent to those skilled in the art are accomplished by reacting a monoisocyanate with an organic compound having at least two hydroxyl groups and a molecular weight of from about 60 to about 6,000 (number average molecular weight as determined by end group analysis). This reaction product is then further reacted with a specified isomer composition of diphenylmethane diisocyanate in an amount sufficient to provide a liquid allophanate-modified MDI having an NCO content of about 12.0 to 30.0%. (Typically, the diphenylmethane diisocyanate isomer composition contains from about 0 to about 60% by weight 2,4'-diphenyl-methane diisocyanate, less than 6% by weight 2,2'-MDI and the remainder 4,4'-MDI.) This liquid allophanate-modified MDI is then reacted with (a) an organic material containing two or more hydroxy, primary amine or secondary amino groups or any combination thereof having a molecular weight of from 40 to 6000, (b) a diol having a molecular weight of from 60 to 200 or a combination of (a) and (b) wherein the resultant liquid prepolymer has an isocyanate group content of from 5 to 29% by weight.

The liquid, allophanate-modified MDI prepolymers obtained by this process are useful in the production of RIM elastomers having improved flex modulus. Such RIM elastomers may be produced in accordance with techniques known to those skilled in the art.

It is a distinct feature of the present invention that the liquid allophanate-modified MDI prepolymers are stable and liquid at 25° C. As used herein, the term "stable" means that the NCO content of the isocyanate does change more than one percent and the viscosity does not change more than ten percent when stored at 25° C. for 3 months. As used herein, the term "liquid" means that the modified isocyanate does not precipitate solids when stored at 25° C. for 3 months.

The prepolymers of the present invention are particularly useful in automotive RIM, shoe soles and rigid foam applications.

DETAILED DESCRIPTION OF THE INVENTION

The present invention relates to isocyanate-terminated, allophanate-modified MDI prepolymers containing urethane, urea or biuret groups having isocyanate group contents of from about 5 to about 29%, preferably from about 12 to about 27% by weight and to a process for the production of these allophanate-modified MDI compositions.

The present invention also relates to reaction injection molded (RIM) elastomers produced from these allophanate-modified MDI compositions.

The allophanate-modified MDI compositions of the present invention may be prepared by (1) reacting a monoisocyanate with an organic compound having at least two hydroxyl groups and a molecular weight of from about 60 to about 6,000 (number average as determined by end group analysis) to produce a urethane and (2) reacting the urethane produced in (1) with an isomer mixture of MDI satisfying specified compositional requirements to form an allophanate.

Any of the known monoisocyanates may be used to produce urethanes in accordance with the present invention. Specific examples of suitable monoisocyanates include: phenyl isocyanate, 2,6-dimethylphenyl isocyanate, any of the isomers of toluene monoisocyanate, butyl isocyanate and hexyl isocyanate. Phenyl isocyanate, 2,6-dimethylphenyl isocyanate, and ortho-tolyl isocyanate are particularly preferred.

The organic compounds containing two or more hydroxyl groups and having molecular weights of from about 60 to about 6000 useful in the production of urethanes in accordance with the present invention include: diols, polyester polyols, polyether polyols, polyhydroxy polycarbonates, polyhydroxy polyacetals, polyhydroxy polyacrylates, polyhydroxy polyester amides, and polyhydroxy polythioethers. Diols, polyester polyols, polyether polyols, and polyhydroxy polycarbonates are preferred.

Suitable polyester polyols include reaction products of polyhydric (preferably dihydric alcohols to which trihydric alcohols may be added) and polybasic (preferably dibasic) carboxylic acids. Polycarboxylic acids, the corresponding carboxylic acid anhydrides and polycarboxylic acid esters of lower alcohols and mixtures thereof may also be used to prepare the polyesters. The polycarboxylic acids may be aliphatic, cycloaliphatic, aromatic and/or heterocyclic and they may be substituted, e.g. by halogen atoms, and/or unsaturated. Specific examples of suitable polycarboxylic acids and derivatives thereof include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate.

Suitable polyhydric alcohols include: ethylene glycol; 1,2- and 1,3-propylene glycol; 1,3-and 1,4-butylene glycol; 1,6-hexanediol; 1,8-octanediol; neopentyl glycol; cyclohexanedimethanol; 1,4-bis(hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol; polybutylene glycol; glycerine; and trimethylolpropane. The polyester polyol may also contain a portion of carboxyl end groups. Polyesters of lactones (e.g., ε-caprolactone) or hydroxyl carboxylic acids (e.g., ω-hydroxycaproic acid) may also be used.

Any of the known polycarbonates containing hydroxyl groups may be used in the practice of the present invention. Such polycarbonates are generally produced by reacting a diol (e.g., 1,3-propanediol, 1,4-butanediol, 1,6-hexanediol, diethylene glycol, triethylene glycol and tetraethylene glycol) with phosgene, a diarylcarbonate such as diphenylcarbonate or with a cyclic carbonate such as ethylene or propylene carbonate. Polyester carbonates obtained by reacting a polyester or polylactone with phosgene, a diaryl carbonate or a cyclic carbonate are also suitable.

Any of the known polyether polyols having a functionality of at least 2 and a molecular weight of from about 60 to about 6,000 may be used in the process of the present invention. Such polyether polyols may be produced by reacting a starting compound which contains reactive hydrogen atoms with one or more alkylene oxides (e.g., ethylene oxide, propylene oxide, butylene oxide, styrene oxide, tetrahydrofuran, epichlorohydrin or mixtures of these alkylene oxides) in accordance with techniques known to those skilled in the art. Polyether polyols which do not contain more than about 10% by weight of ethylene oxide units are preferred. Polyethers produced without the addition of ethylene oxide are particularly preferred. Suitable starting compounds containing reactive hydrogen atoms from which polyether polyols may be produced include: the polyhydric alcohols set forth for preparing polyester polyols, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, and 1,1,1-or 1,1,2-tris-(hydroxyl phenyl)-ethane.

Polyethers modified by vinyl polymers may also be used in the process of the present invention. Suitable modified polyethers may be produced by polymerizing a material such as styrene and/or acrylonitrile in the presence of a polyether. (See, e.g., U.S. Pat. Nos. 3,383,351; 3,304,273; 3,523,095; 3,110,695 and German Patent No. 1,152,536).

Polythioethers which are useful in the process of the present invention include the condensation products obtained from thiodiglycol on its own and/or with other glycols, dicarboxylic acids, formaldehyde, aminocarboxylic acids or amino alcohols. These condensation products are polythio-mixed ethers, polythioether esters or polythioether ester amides, depending on the co-components.

Amine-terminated polyether useful in the process of the present invention may be prepared by reacting a primary amine with a polyether containing terminal leaving groups (e.g., halides or mesylates) as disclosed in commonly assigned U.S. patent application Ser. No. 07/957,929, filed on Oct. 7, 1992, and U.S. Pat. Nos. 3,666,726; 3,691,112; and 5,066,824.

Polyacetals which may be used in the process of the present invention include those compounds prepared from aldehydes (e.g., formaldehyde) and glycols (e.g., diethylene glycol, triethylene glycol, ethoxylated 4,4'-dihydroxydiphenyldimethylmethane, and 1,6-hexanediol). Suitable polyacetals may also be prepared by polymerizing cyclic acetals.

Polyhydroxy polyester amides and polyamines which may be used in the process of the present invention include the predominantly linear condensates obtained from polybasic saturated and unsaturated carboxylic acids or their anhydrides and polyvalent saturated or unsaturated aminoalcohols, diamines, polyamines and mixtures thereof.

Suitable hydroxy-functional polyacrylates may be produced from monomers such as acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropy acrylate, 3-hydroxypropyl methacrylate, glycidyl acrylate, glycidyl methacrylate, 2-isocyanatoethyl acrylate and 2-isocyanatoethyl methacrylate.

Lower molecular weight compounds having at least two hydroxyl groups and an average molecular weight of from about 60 to about 200 may be used in the process of the present invention either alone or in combination with higher molecular weight isocyanate-reactive compounds having a functionality of at least two and a molecular weight no greater than 6,000. Useful low molecular weight materials include the polyhydric alcohols which have previously been described for the preparation of the polyester polyols and polyether polyols. Dihydric alcohols are preferred.

In the reaction of the monoisocyanate with the compound having at least two hydroxyl groups and a molecular weight of from about 60 to about 6,000, the NCO to OH equivalent ratio may be from about 0.8 to about 1.2, preferably from about 0.9 to about 1.1, most preferably about 1.0. The reaction of monoisocyanate and hydroxyl compound to form the urethane is generally monitored until at least 90% of the stoichiometrically limiting component has reacted.

Solvents which are typically inert to the isocyanate, for example toluene, tetrahydrofuran, o-dichlorobenzene or the like may be employed in the process of the present invention.

The urethane obtained by reacting the monoisocyanate with the hydroxyl compound is then reacted with the isomer composition of diphenylmethane diisocyanate in an amount sufficient to provide an allophanate having an isocyanate group content of from about 12.0 to about 30.0%, preferably from about 17 to about 28%. The isomer composition of the diphenylmethane diisocyanate is made up of from about 0 to about 60% (preferably from about 2 to about 30%) by weight 2,4'-diphenylmethane diisocyanate, less than 6% (preferably from about 0 to about 1.0%) by weight 2,2'-diphenylmethane diisocyanate, with the remainder being 4,4'-diphenylmethane diisocyanate.

The allophanate-forming reaction may be conducted in the presence of a catalyst. Useful catalysts are those which can be neutralized or otherwise stopped from adversely catalyzing subsequent reactions. Specific examples of useful catalysts include: zinc acetylacetonate, zinc 2-ethylhexanoate, cobalt 2-ethylhexanoate, cobalt naphthanate, lead linoresinate, and stannous octoate. Zinc acetyl acetonate and stannous octoate are preferred catalysts. Examples of catalyst stoppers include acidic materials such as anhydrous hydrochloric acid, sulfuric acid, benzoyl chloride, Lewis acids, and bis-(2-ethylhexyl) phosphate. Benzoyl chloride and bis-(2-ethyl-hexyl) phosphate are preferred catalyst stoppers. A ratio of 2 equivalents of catalyst stopper to each mole of catalyst ensures that the allophanate-forming reaction is stopped.

In a preferred embodiment of the process of the invention, the allophanate can be prepared by reacting the monoisocyanate with an organic compound having at least two hydroxyl groups and a molecular weight of from about 60 to about 6000 at a temperature of from about 80° to about 150° C., preferably from about 80° to about 120° C. The resultant urethane may then be dissolved in the specified MDI isomer composition and converted to an allophanate modified MDI by heating to a temperature of from about 60° to about 120° C. in the presence of zinc acetyl acetonate as catalyst, and benzoyl chloride as the catalyst deactivator. It is preferred that the catalyst and catalyst deactivator be used in amounts such that the equivalent ratio of deactivator to catalyst is from about 1:1 to about 3:1, preferably about 2:1.

The allophanate-modified MDI composition may be further reacted with an organic, isocyanate-reactive compound having two or more active hydrogen groups to produce an MDI prepolymer which is allophanate-modified and which contains urethane, urea and/or biuret groups. Isocyanate-reactive compounds which may be reacted with the allophanate-modified MDI to produce the prepolymers of the present invention include high and/or low molecular weight organic materials containing two or more and preferably 2 to 3 active hydrogen groups such as hydroxyl, primary or secondary amino groups, etc. Suitable high molecular weight organic compounds may have molecular weights (number average as determined by end group analysis) of from 400 to about 6000, preferably from about 2000 to about 5000. Examples of such compounds were described above as being suitable for the production of the urethane from which the allophanate-modified MDI is produced. Suitable low molecular weight organic compounds may have molecular weights ranging from about 40 up to 400, preferably from about 60 to about 200, most preferably about 76 to about 90. Examples of such compounds were described above as being suitable for the production of the urethane from which the allophanate-modified MDI is produced. Diols having a molecular weight of from about 60 to about 200 are particularly preferred.

The process in which the allophanate-modified MDI is further modified to include urethane, urea, or biuret groups may be carried out in accordance with any of the known techniques. For example, the reactants may be heated to a temperature from about 40° to about 150° C., preferably from about 50° to about 100° C. to form urethane or urea groups. Heating to a temperature of from about 100° to about 150° C., preferably from about 110° to about 120° C. will promote formation of biuret groups.

In addition to the above-mentioned isocyanate-reactive components which are preferably difunctional, monofunctional and even small portions of trifunctional and higher functional components generally known in polyurethane chemistry, such as trimethylolpropane, may be used when slight branching of the product is desired.

In the process of the invention, the isocyanate-reactive, preferably hydroxyl functional, organic material(s) may be reacted with the allophanate-modified MDI at temperatures of from about 40° to about 150° C., preferably from about 50° to about 100° C., over a period of time sufficient to complete the reaction.

Catalysts and solvents may be used to promote the reaction. Examples of catalysts which promote the urethane-formation reaction include di-n-butyltin dichloride, di-n-butyltin diacetate, di-n-butyltin dilaurate, triethylenediamine, and bismuth nitrate. Examples of the useful solvents include toluene, tetrahydrofuran, and chlorobenzene.

The allophanate-modified MDI prepolymer containing urethane, urea and/or biuret groups is a liquid isocyanate prepolymer having an isocyanate group content of from about 5 to about 29%, preferably from about 12 to about.27%. These liquid isocyanate prepolymers has been found to be particularly useful in the preparation of isocyanate reaction products such as polyurethanes.

The allophanate-modified MDI prepolymers of the present invention containing urethane, urea and/or biuret groups may be further combined with one or more isocyanate-reactive compounds, a catalyst and any of the other known additives and processing aids which are known to be useful in RIM processes. This reactive mixture may then be molded in accordance with known reaction injection molding techniques.

Isocyanate-reactive compounds useful for producing the reactive mixture to be molded include those described above as being useful for the production of the allophanate-modified MDI. Other suitable isocyanate-reactive materials include the polyethers, polyesters, polythioethers, polyacetals, polycarbonates, and amine terminated polyethers containing from 1 to 4 isocyanate-reactive groups and having molecular weights (number average as determined by end group analysis) of from about 500 to about 10,000, preferably from about 1000 to about 8000 of the type known for the production of polyurethanes.

Polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine. It is preferred to use polyethers which contain substantial amounts of primary hydroxyl groups in terminal positions (greater than 80% by weight, based on all of the terminal hydroxyl groups present in the polyether).

Polyether polyols are preferably used. Preferred polyethers include: those compounds based on di- or tri-functional starters such as water, ethylene glycol, propylene glycol, glycerin, trimethylolpropane, or triethanolamine. These preferred compounds include copolymers of ethylene oxide and propylene oxide with greater than 15% by weight of the oxides being ethylene oxides.

Suitable high molecular weight polyesters include the reaction products of polyhydric, preferably dihydric alcohols (optionally, in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Patents. Finally, representatives of the many and varied compounds which may be used in accordance with the invention may be found, for example, in High Polymers, Volume XVI, "Polyurethanes; Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Amine terminated polyethers containing primary or secondary (preferably primary) aromatically or aliphatically (preferably aliphatically) bound amino groups, wherein amino end groups can also be attached to the polyether chain through urethane or ester groups may also be used to produce reaction injection molded articles from the prepolymers of the present invention. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266 and 4,532:317 and in U.S. application Ser. Nos. 437,641 (filed Oct. 19, 1982), 778,656 (filed Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the above-mentioned compounds.

In addition to the above-described high molecular weight isocyanate-reactive materials, a dispersion of a polyurea and/or polyhydrazo-dicarbonamide in a relatively high molecular weight organic compound containing at least two hydroxyl groups or a polymer polyol prepared by polymerizing an ethylenically unsaturated monomer or monomers in a relatively high molecular weight organic compound containing at least two hydroxyl groups, or blends of such dispersions and polymer polyols may also be used to produce RIM articles from the prepolymers of the present invention. It is possible to use these types of polyols either alone, or in conjunction with the conventional polyethers described hereinabove.

These polyol dispersions and polymer polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent: 1,152,536, the disclosures of which are herein incorporated by reference. Polymer polyols are commercially available from Bayer AG, BASF, and Union Carbide.

The preferred PHD polyols include, for example, the polyurea of toluene diisocyanate and hydrazine dispersed in polyether polyol, and the preferred polymer polyols include, for example, those based on the monomers styrene and acrylonitrile.

Chain extenders useful in producing polyurethanes from the prepolymers of the present invention include those having a molecular weight of from 61 to 500, preferably from 61 to 400, selected from diols, triols, primary amines, secondary amines, amino alcohols, and mixtures thereof.

Suitable organic diols and triols generally have a molecular weight of from about 62 to about 500, preferably from about 62 to about 400. These diols and triols include: 2-methyl-1,3-propanediol, ethylene glycol, 1,2, and 1,3-propanediol, 1,3- and 1,4-and 2,3-butanediol, 1,6-hexanediol, 1,10-decanediol, diethylene glycol, triethylene glycol, tetraethylene glycol, dipropylene glycol, tripropylene glycol, glycerol, trimethylolpropane, neopentyl glycol, cyclohexanedimethanol, and 2,2,4-trimethylpentane-1,3-diol. Preferred diols and triols include, for example, 1,4-butanediol and 2-methyl-1,3-propanediol.

Organic primary amines, secondary amines, and amino alcohols having molecular weights of from about 61 to about 500, preferably from about 61 to about 400 may also be used as chain extenders. Examples of such amine chain extenders include: cyclohexylamine, 2-methyl-1,5-pentane diamine, diethanolamine, monoethanolamine, propylamine, butylamine, dibutylamine, hexylamine, monoisopropanolamine, diisopropanolamine, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)-piperazine, aminoethyl piperazine, 1,2-diaminocyclo-hexane, polyoxyalkyleneamines, bis-(p-aminocyclo-hexyl)methane, triethylenetetramine, tetraethylenepentamine, mixtures thereof, and the like.

Other suitable amines include, for example, 1,8-p-diamino-menthane, bis(4-aminocyclohexyl)methane, bis(4-amino-3-methyl-cyclohexyl)-methane, bis(4-amino-3,5-dimethylcyclohexyl)methane, bis(4-amino-2,3,5-trimethylcyclohexyl)methane, 1,1-bis(4-aminocyclohexyl)propane, 2,2-(bis(4-aminocyclohexyl)propane, 1,1-bis(4-aminocyclohexyl)ethane, 1,1 -bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclo-hexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclo-hexyl)butane, 2,4-diaminodicyclohexylmethane, 4-aminocyclohexyl-4-amino-3-methyl-cyclohexylmethane, 4-amino-3,5-dimethylcyclohexyl-4-amino-3-methylcyclohexylmethane, and 2-(4-aminocyclohexyl)-2-(4-amino-3-methylcyclohexyl)methane.

It is also possible to use the so-called amine terminated polyethers having low molecular weights. Among the suitable amine terminated polyethers are those containing primary or secondary (preferably primary) aromatically or aliphatically (preferably aliphatically) bound amino groups in which amino end groups can also be attached to the polyether chain through urethane or ester groups. Suitable compounds include those which are commercially available from Huntsman, Inc. under the names Jeffamine D400 and Jeffamine D230.

These low molecular weight amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551, 605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can also be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis.

Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos. 437,641 (filed Oct. 19, 1982), 778,656 (filed Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the above-mentioned compounds.

Preferred amine compounds include cyclohexyl-amine, diethanolamine, dibutylamine, and monoethanolamine.

Other suitable amines are aromatic polyamines, including diamines, having molecular weights of less than 500. These aromatic diamines include, for example, 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenyl-methane, 3,5-diethyl-5,5'-diisopropyl-4,4'diamino diphenylmethane, 1-methyl-2,6-diamino-3-isopropylbenzene and mixtures of the above diamines, such as, for example, mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

Aromatic polyamines may be used in admixture with sterically hindered chain extenders and include, for example, 2,4- and 2,6-diamino toluene, 2,4'- and/or 4,4'-diaminodiphenylmethane, 1,2- and 1,4-phenylene diamine, naphthalene-1,5-diamine and triphenyl-methane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable.

Low molecular weight (i.e., molecular weight of from about 32 to about 500, preferably from about 90 to about 400) organic monofunctional alcohols may also be used to produce polyurethane articles from the prepolymers of the present invention. Examples of such alcohols include: methanol, ethanol, 1-propanol, 2-propanol, n-butanol, 2-ethyl-1-hexanol, stearyl alcohol, and alkyl substituted phenols containing from 1 to 22 carbon atoms in the alkyl group such as, for example, nonylphenol. n-Butanol and 2-ethyl-1-hexanol are preferred.

Catalysts capable of catalyzing the reaction between the isocyanate groups and ,isocyanate-reactive groups include metal carboxylates, metal halides, ammonium carboxylates, and mixtures thereof, Of the metal halides, the metal chlorides are preferred. These catalysts may be used alone or in conjunction with a tin-sulfur catalyst and/or a tertiary amine catalyst.

Examples of suitable metal carboxylates are tin carboxylates such as dimethyltin dilaurate and bismuth carboxylates such as bismuth tri-neodecanoate. Suitable metal halides include tin halides, especially tin chlorides such as dimethyltin dichloride. Examples of suitable ammonium carboxylates are trimethylhydroxyethylammonium-2-ethylhexanoate (i.e. Dabco TMR). Tin carboxylates such as dimethyltin dilaurate and bismuth carboxylates such as bismuth tri-neodecanoate are preferred catalysts. Metal chlorides such as dimethyltin dichloride are also preferred catalysts.

Suitable tin-sulfur catalysts include dialkyltin dilaurylmercaptides such as dibutyltin dilaurylmercaptide and dimethyltin dilaurylmercaptide.

Suitable tertiary amine .catalysts include triethylamine, triethylenediamine, tributylamine, N-methylmorpholine, N-ethylmorpholine, triethanolamine, triisopropanol-amine, N-methyldiethanolamine, N-ethyldiethanolamine, and N,N-dimethylethanolamine.

Other additives which may be used in the RIM process according to the present invention include surface-active additives such as emulsifiers and foam stabilizers. Examples include N-stearyl-N',N'-bis-hydroxyethyl urea, oleyl polyoxyethylene amide, stearyl diethanoi amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers. Suitable antioxidants include, for example, Irganox 245, and suitable UV stabilizers include, for example, Tinuvin 765. However, any of the known antioxidants and/or UV stabilizers may be used. As set forth hereinabove, specific advantages have been found in reaction mixtures containing antioxidants and/or UV stabilizers have been added.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

Any of the known RIM processes may be used to produce molded articles from reaction mixtures containing the allophanate-modified compositions of the present invention.

Having thus described our invention, the following Examples are given as being illustrative thereof. All parts and percentages given in these Examples are parts by weight or percentages by weight, unless otherwise indicated.

EXAMPLES

The following materials were used in the Examples:
POLYOL A: A propylene glycol/propylene oxide adduct having a molecular weight of 2,000 and a functionality of about 2.
POLYOL B: A glycerine/propylene oxide/ethylene oxide adduct terminated with 17% by weight ethylene oxide having a molecular weight of 4800 and a functionality of about 3.
POLYOL C: A propylene glycol/propylene oxide adduct having a molecular weight of 425 and a functionality of about 2.

POLYOL D: A polyester polyol based on pentaerythritol, adipic acid and oleic acid (in a 3:2:6) molar ratio having an OH number of 51 and a functionality of about 1.8.

POLYOL E: An ethylene diamine initiated, propoxylated polyether having an OH number of 630 and a functionality of about 4 in which zinc stearate is present in an amount such that the weight ratio of polyether to zinc stearate is 3:2.

POLYOL F: An ethylene diamine initiated, propoxylated polyether having an OH number of 630 and a functionality of 4.

PG: Propylene glycol.

1,3-B: 1,3-butanediol.

DPG: Dipropylene glycol.

TPG: Tripropylene glycol.

T-12: Di-n-butyltin dilaurate.

ZnAcAc: Zinc acetylacetonate.

MDI-x: Diphenylmethane diisocyanate which contains less than 6% by weight 2,2'-MDI and in which x represents the percent by weight 2,4'-MDI and 100%-x represents the percent by weight 4,4'- and 2,2'-MDI.

DETDA: An 80/20 mixture of 1-methyl-3,5-diethyl-2,4-phenyl diamine and 1-methyl-3,5-diethyl-2,6-phenyl diamine.

L-5304: A silicone surfactant which is commercially available from Union Carbide.

Dabco 33LV: 1,4-diazabicyclo[2,2,2]octane as a 33% by weight solution in dipropylene glycol which is commercially available from Air Products.

UL-28: dibutyl tin dilaurate which is commercially available from Witco under the name Fomrez UL-28.

EXAMPLE 1

23.5 pads phenyl isocyanate and 42.0 pads POLYOL C were charged to a reactor equipped with a stirrer and heated with stirring to 60° C. 100 ppm T-12 were then added to the reactor and the contents of the reactor were maintained at 60°–70° C. for 6 hours. A viscous liquid having a strong urethane peak in the infrared scan was obtained.

152 pads MDI-2 were added to this viscous liquid. The temperature of the mixture was then raised to 90° C. 0.033 pads ZnAcAc were then added and the contents of the reactor were maintained at 90° C. for 1 hour. The NCO content of the reaction mixture after this 1 hour was 19.4%. 0.13 pads benzoyl chloride were then added to the reactor and the contents of the reactor were cooled to 25° C. The product allophanate-modified MDI was a clear liquid having an NCO content of 19.4%. This product was storage stable at 25° C.

100 pads of this allophanate-modified isocyanate were heated to 60° C. 29.9 pads POLYOL A and 10.0 pads POLYOL B were added with stirring to the heated isocyanate. This mixture was maintained at 60° C. for 2 hours and then cooled to 25° C. The product prepolymer was a clear liquid having an isocyanate content of 12.6%. This product was storage stable at 25° C.

EXAMPLE 2

23.5 parts by weight phenyl isocyanate and 19.0 pads of tripropylene glycol were charged to a reactor equipped with a stirrer and heated with stirring to 60° C. 100 ppm T-12 were then added to the reactor and the contents of the reactor were maintained at 60°–70° C. for 6 hours. A viscous liquid having a strong urethane peak in the infrared scan was obtained.

152.4 pads of MDI-2 were added to the viscous liquid. The temperature of the mixture was then raised to 90° C. 0.033 parts ZnAcAc were then added and the contents of the reactor were maintained at 90° C. for 1 hour. The NCO content of the reaction mixture after this 1 hour was 22.0%. 0.13 parts benzoyl chloride were then added to the reactor and the contents of the reactor were cooled to 25° C. The product allophanate-modified MDI was a clear liquid having an NCO content of 22.0%. This product which was storage stable at 25° C.

100 parts of this allophanate-modified isocyanate were heated to 60° C. 40.2 parts of POLYOL A and 13.4 parts of POLYOL B were added with stirring to the heated isocyanate. This mixture was maintained at 60° C. for 2 hours and then cooled to 25° C. The product prepolymer was a clear liquid having an isocyanate content of 12.6%. This product was storage stable at 25° C.

EXAMPLE 3

23.5 pads of phenyl isocyanate and 13.2 parts of dipropylene glycol were charged to a reactor equipped with a stiffer and and heated with stirring to 60° C. 100 ppm T-12 were then added to the reactor and the contents of the reactor were maintained at 60°–70° C. for 6 hours. A viscous liquid having a strong urethane peak in the infrared scan was obtained.

152.4 parts of MDI-2 were added to this viscous liquid. The temperature of the mixture was then raised to 90° C. 0.033 parts ZnAcAc were then added and the contents of the reactor were maintained at 90° C. for 1 hour. The NCO content of the reaction mixture after 1 hour was 22.1%. 13 parts of benzoyl chloride were then added to the reactor and the contents of the reactor were cooled to 25° C. The product allophanate-modified MDI was a clear liquid having an NCO content 22.1%. This product was storage stable at 25° C.

100 parts of this allophanate-modified MDI were heated to 60° C. 43.3 parts of POLYOL A and 14.4 parts of POLYOL B were added with stirring to the heated isocyanate. This mixture was maintained at 60° C. for 2 hours and then cooled to 25° C. The product prepolymer was a clear liquid having an isocyanate content of 12.7%. This product was storage stable at 25° C.

EXAMPLE 4

29.0 parts of 2,6-dimethyl-phenyl isocyanate and 13.2 parts of dipropylene glycol were charged to a reactor equipped with a stirrer and heated with stirring to 60° C. 100 ppm T-12 were then added to the reactor and the contents of the reactor were maintained at 60°–70° C. for 6 hours. A viscous liquid having a strong urethane peak in the infrared scan was obtained.

152.4 parts of MDI-2 were added to this viscous liquid. The temperature of the mixture was then raised to 90° C. 0.033 parts of ZnAcAc were then added and the contents of the reactor maintained at 90° C. for 1 hour. The NCO content of the reaction mixture after this 1 hour was 20.7%. 0.13 parts of benzoyl chloride were then added to the reactor and the contents of the reactor were cooled to 25° C. The product allophanate-modified MDI was a clear liquid having an NCO content of 20.7%. This product was storage stable at 25° C.

100 parts of this allophanate-modified isocyanate were heated to 60° C. 40.7 parts of POLYOL A and 13.5 parts of POLYOL B were added with stirring to the heated isocyanate. This mixture was maintained at 60° C. for 2 hours and then cooled to 25° C. The product prepolymer was a clear liquid having an isocyanate content of 11.2%. This product was storage stable at 25° C.

EXAMPLE 5

29.0 parts of 2,6-dimethyl-phenyl isocyanate and. 42.0 parts of POLYOL C were charged to a reactor equipped with a stirrer and heated with stirring to 60° C. 100 ppm T-12 were then added to the reactor and the contents of the reactor were maintained at 60°–70° C. for 6 hours. A viscous liquid having a strong urethane peak in the infrared scan was obtained.

152.4 parts of MDI-2 were added to this viscous liquid. The temperature of the mixture was then raised to 90° C. 0.033 parts of ZnAcAc were then added and the contents of the reactor were maintained at 90° C. for 1 hour. The NCO content of the mixture after this 1 hour was 18.2%. 0.13 pads of benzoyl chloride were then added to the reactor and the contents of the reactor were cooled to 25° C. The product allophanate-modified MDI was a clear liquid having an NCO content of 18.2%. This product was storage stable at 25° C.

100 parts of this allophanate-modified isocyanate were heated to 60° C. 27.7 parts of POLYOL A and 9.2 pads of POLYOL B were added with stirring to the heated isocyanate. This mixture was maintained at 60° C. for 2 hours and then cooled to 25° C. The product prepolymer was a clear liquid having an isocyanate content of 11.5%. This product was storage stable at 25° C.

EXAMPLE 6

53.6 pads of 2,6-diisopropylphenyl isocyanate and 11.9 parts of 1,3-butanediol were charged to a reactor equipped with a stirrer and heated with stirring to 60° C. 100 ppm T-12 were then added to the reactor and the contents of the reactor were maintained at 60°–70° C. for 6 hours. A viscous liquid having a strong urethane peak in the infrared scan was obtained.

203.2 pads of MDI-2 were added to the viscous liquid. The temperature of the mixture was then raised to 90° C. 0.033 pads of ZnAcAc were then added and the contents of the reactor were maintained at 90° C. for 1 hour. The NCO content of the reaction mixture after this 1 hour was 21.1%. 0.13 pads of benzoyl chloride were then added to the reactor and the contents of the reactor were cooled to 25° C. The product allophanate-modified MDI was a clear liquid having an isocyanate content of 21.1%. This product was storage stable at 25° C. 100 pads of this allophanate-modified isocyanate were heated to 60° C. 36.7 pads of POLYOL A and 12.6 parts of POLYOL B were added with stirring to the heated isocyanate. This mixture was maintained at 60° C. for 2 hours and then cooled to 25° C. The product prepolymer was a clear liquid having an isocyanate content of 12.8%. This product was storage stable at 25° C.

EXAMPLE 7

29.5 parts phenyl isocyanate and 11.2 parts 1,3-B were charged to a stirred reactor and heated at 80° C. for about 2 hours. After 2 hours, the NCO content of phenyl isocyanate was less than 0.1%. 192 parts MDI-2 (98% 4,4'-MDI and 2% 2,4'-MDI) and 0.023 parts ZnAcAc were then added with stirring to the reactor. The contents of the reactor were then heated to 90° C. and maintained at that temperature for 3 hours. After 3 hours, the NCO content of the reaction mixture was 22.9%. 0.093 pads of benzoyl chloride were then added and the reaction mixture was cooled to 60° C. 35.5 pads of POLYOL B and 102 parts of POLYOL A were then added to the reactor and the contents of the reactor were maintained at 60° C. A clear, light yellow liquid having an NCO content of 13.0% and a viscosity at 25° C. of 9070 mPa-s was obtained.

EXAMPLE 8

36.6 parts of 2,6-dimethylphenyl isocyanate and 11.2 parts of 1,3-B were charged to a reactor equipped with a stirrer and heated with stirring to 80° C. The contents of the reactor were maintained at 80° C. for 4 hours. The solid mass which formed was dissolved in 192 parts of MDI-2. The resultant solution was heated to 90° C. and 0.024 parts ZnAcAc were added. The contents of the reactor were then maintained at 90° C. for 5 hours. The isocyanate content of the reaction mixture was then determined to be 22.6%. 0.09 parts benzoyl chloride were then added to the reaction mixture and the reaction mixture was cooled to 60° C. 35.5 parts of POLYOL B and 102 parts of POLYOL A were added to the reaction mixture which was then heated to 60° C. and maintained at that temperature for 3 hours. The product was a clear, light yellow, liquid having an NCO content of 12.9% and a viscosity at 25° C. of 7130 mPa.s.

EXAMPLE 9 (COMPARATIVE)

654 parts MDI-2 and 32 parts of 1-butanol were charged to a reactor equipped with a stirrer. This mixture was then heated with stirring to 60° C. 0.034 parts of ZnAcAc were added to the reactor and the contents of the reactor were then heated to 90° C. After being maintained at 90° C. for 1 hour, the isocyanate content of the mixture was 26.8%. The reaction mixture was then cooled to 60° C. and 0.069 parts of benzoyl chloride were added. After stirring the mixture for 15 minutes at 60° C., 144 parts of POLYOL B and 420 parts of POLYOL A were added. The contents of the reactor were then maintained at 60° C. for 2 hours. The reaction mixture was then cooled to 25° C. The product had an isocyanate content of 12.9% and a viscosity at 25° C. of 2640 mPa.s.

EXAMPLE 10 (COMPARATIVE)

702 parts of MDI-2 and 40.7 parts of 1-butanol were charged to a reactor equipped with a stirrer. The contents of the reactor were then heated with stirring to 60° C. 0.037 parts of ZnAcAc were added to the reactor and the contents of the reactor were heated with stirring to 90° C. After one hour at 90° C., the reaction mixture had an NCO content of 25.7%. The reaction mixture was then cooled to 60° C. and 0.087 parts of benzoyl chloride were added to the mixture. The mixture was then stirred for 15 minutes. 142 parts of POLYOL B and 415 parts of POLYOL A were then added. The reaction mixture was maintained at 60° C. for 2 hours and then cooled to 25° C. The product had an NCO content of 13.0% and a viscosity at 25° C. of 2760 mPa.s.

EXAMPLES 11–14

Allophanate-modified prepolymers prepared in accordance with Examples 7–10 were used to produce reaction injected molded articles. The specific materials and the amounts of those materials used are reported in Table 1. The polyurethane-forming system was injected into a mold with a Hennecke RIM-DO-MAT RIM machine equipped with a mixhead. Parts were molded in an end-gated rectangular mold measuring 3×200×300 mm. The injection pressure was 200 bar on both the polyol and the isocyanate side. The throughput in the mixhead was maintained at 200 g/s.

The molding procedure used in each of Examples 11–22 was as follows. A polyol blend composed of the materials in the amounts of those materials indicated in TABLE 1 was put into the RIM machine and heated to 45° C. The isocyanate prepolymer indicated in TABLE 1 was then added to the RIM machine and heated to 45° C. The machine was set up for 200 bar injection pressure and 200 g/s throughput. The mold temperature was maintained at 65° C. Parts were made under these conditions and demolded in 30 seconds. Physical properties of the molded article were measured after postcuring for 1 hour. The properties of these molded articles are reported in Table 1.

In each of Tables 1, 2 and 3, the property values of the molded articles reported were determined in accordance with the following ASTM methods:

| | |
|---|---|
| Heat Sag | ASTM D-3768 |
| Flex Modulus | ASTM D-790 |
| Notched Izod | ASTM D-256 |
| Elongation | ASTM D-638 |
| Tensile Strength | ASTM D-638 |
| Tear Strength | ASTM D-624 |

TABLE 1

| Example | 11 | 12 | 13 | 14 |
|---|---|---|---|---|
| B-SIDE | | | | |
| DETDA, pbw | 30 | 30 | 30 | 30 |
| POLYOL D, pbw | 3.8 | 3.8 | 3.8 | 3.8 |
| POLYOL E, pbw | 3 | 3 | 3 | 3 |
| L-5304, pbw | 0.4 | 0.4 | 0.4 | 0.4 |
| POLYOL F, pbw | 1.7 | 1.7 | 1.7 | 1.7 |
| POLYOL B, pbw | 60.5 | 60.5 | 60.5 | 60.5 |
| UL-28, pbw | 0.3 | 0.3 | 0.3 | 0.3 |
| Dabco 33-LV, pbw | 0.1 | 0.1 | 0.1 | 0.1 |
| A-SIDE | | | | |
| ISO | Example 7 | Example 8 | Example 9 | Example 10 |
| NCO Index | 105 | 105 | 105 | 105 |
| Wt % NCO | 13.0 | 12.9 | 12.9 | 13.0 |
| Moles Allophanate/ 100 g NCO | 0.0329 | 0.033 | 0.0346 | 0.0424 |
| Props. of Molded Article | | | | |
| Flex Mod. at rm. temp., lb/in² | 40,100 | 57,200 | 34,400 | 36,400 |
| Heat Sag (6"/250° F.) | 47 | 19 | 32 | 22 |
| Heat Sag (4"/325° F.) | 51 | 24 | 47 | 47 |
| Notched Izod (ft lb/in) | 8.1 | 11.7 | 10.3 | 9.4 |
| Elongation % | 170 | 210 | 265 | 280 |
| Tensile Strength, lb/in² | 3,300 | 4,280 | 4,000 | 4,200 |
| Tear Strength (pli) | 440 | 525 | 520 | 510 |

EXAMPLES 15–18

The procedure used in Examples 11–14 was repeated using the same processing conditions and materials in the amounts indicated in Table 2. The properties of the RIM elastomers produced are also reported in Table 2.

TABLE 2

| Example | 15 | 16 | 17 | 18 |
|---|---|---|---|---|
| B-SIDE | | | | |
| DETDA, pbw | 35 | 35 | 35 | 35 |
| POLYOL D, pbw | 3.8 | 3.8 | 3.8 | 3.8 |
| POLYOL E, pbw | 3 | 3 | 3 | 3 |
| L-5304, pbw | 0.4 | 0.4 | 0.4 | 0.4 |
| POLYOL F, pbw | 2.2 | 2.2 | 2.2 | 2.2 |
| POLYOL B, pbw | 55.2 | 55.2 | 55.2 | 55.2 |
| UL-28, pbw | 0.2 | 0.2 | 0.2 | 0.2 |
| Dabco-33LV, pbw | 0.2 | 0.2 | 0.2 | 0.2 |
| A-SIDE | | | | |
| ISO | EXAMPLE 7 | EXAMPLE 8 | EXAMPLE 9 | EXAMPLE 10 |
| NCO Index | 105 | 105 | 105 | 105 |
| Moles Allophanate/ 100 g | 0.0329 | 0.033 | 0.0346 | 0.0424 |
| Properties of Molded Article | | | | |
| Flex Mod. at room temp., lb./in² | 66,100 | 66,000 | 46,800 | 49,600 |
| Heat Sag (6"/250° F.) | 30 | 22 | 23 | 20 |
| Heat Sag (4"/325° F.) | 43 | 21 | 39 | 37 |
| Notched Izod (ft.lb./in.) | 8.4 | 10.6 | 11 | 11.3 |
| % Elongation | 195 | 200 | 290 | 285 |
| Tensile Strength, lb./in² | 4,400 | 4,530 | 4,630 | 5,200 |
| Tear Strength (pli) | 585 | 590 | 585 | 635 |

EXAMPLES 19–22

The procedure used in Examples 11–14 was repeated using the same materials and the same molding conditions. The specific amount of each material used and the properties of the product elastomers are reported in TABLE 3.

TABLE 3

| EXAMPLE | 19 | 20 | 21 | 22 |
|---|---|---|---|---|
| B-SIDE | | | | |
| DETDA, pbw | 40 | 40 | 40 | 40 |
| POLYOL D, pbw | 4.3 | 4.3 | 4.3 | 4.3 |
| POLYOL E, pbw | 3.4 | 3.4 | 3.4 | 3.4 |
| L-5304, pbw | 0.4 | 0.4 | 0.4 | 0.4 |
| POLYOL F, pbw | 2.5 | 2.5 | 2.5 | 2.5 |
| POLYOL B, pbw | 49.1 | 49.1 | 49.1 | 49.1 |
| UL-28, pbw | 0.2 | 0.2 | 0.2 | 0.2 |
| Dabco 33-LV, pbw | 0.3 | 0.3 | 0.3 | 0.3 |
| A-SIDE | | | | |
| ISO | EXAMPLE 7 | EXAMPLE 8 | EXAMPLE 9 | EXAMPLE 10 |
| NCO INDEX | 105 | 105 | 105 | 105 |

TABLE 3-continued

| EXAMPLE | 19 | 20 | 21 | 22 |
| --- | --- | --- | --- | --- |
| Moles Allophanate/ 100 g | 0.0329 | 0.033 | 0.0346 | 0.0424 |
| Properties of Elastomer | | | | |
| Flex Mod. at rm. temp., lb./in.$^2$ | 86,300 | 83,000 | 59,200 | 63,500 |
| Heat Sag (6"/250° F.) | 17 | 12 | 15 | 20 |
| Heat Sag (4"/325° F.) | 32 | 16 | 29 | 32 |
| Notched Izod (ft.lb./in.) | 7.0 | 9.2 | 11.6 | 12.2 |
| % Elongation | 180 | 160 | 265 | 250 |
| Tensile Strength (lb./in.$^2$) | 4,800 | 4,370 | 4,760 | 4,400 |
| Tear Strength (pli) | 650 | 615 | 660 | 665 |

It is clear from the data presented that there is a marked improvement in flex modulus at given levels of DETDA when parts are molded from the prepolymers of the present invention. The ability to greatly enhance the hardness with a good balance of elastomeric properties is advantgeous from both a cost and reactivity reduction perspective. Less DETDA and fast reacting amine are necessary to achieve higher flexural moduli. The use of less fast reacting amine slows the system being molded sufficiently to make it possible to fill larger molds without increasing density gradients and other activity related production problems.

Although the invention has been described in detail in the foregoing for the purpose of illustration, it is to be understood that such detail is solely for that purpose and that variations constituting other embodiments can be made therein by those skilled in the art without departing from the spirit and scope of the invention except as it may be limited by the claims.

What is claimed is:

1. A process for the production of a stable, liquid allophanate-modified diphenylmethane diisocyanate prepolymer comprising (a) reacting (1) an organic material having at least two hydroxyl groups and a molecular weight (number average) of from about 60 to 6,000 with (2) a monoisocyanate in amounts such that the isocyanate to hydroxyl group equivalent ratio (NCO/OH) is from about 0.8 to about 1.2, (b) reacting (3) the reaction product of (a) with (4) a mixture of isomers of diphenylmethane diisocyanate which is made up of (i) from about 0 to about 60% by weight of the 2,4'-isomer, (ii) less than 6.0% by weight of the 2,2'-isomer, and (iii) from about 34 to about 100% by weight of the 4,4'-isomer in amounts such that a liquid allophanate-modified MDI having an isocyanate content of from about 12 to about 30% is formed, and (c) reacting (5) the reaction product of (b) with (6) an isocyanate-reactive compound having from 1 to 4 isocyanate-reactive groups and a molecular weight (number average) of from about 90 to about 10,000 in amounts such that a stable, liquid allophanate-modified diphenylmethane diisocyanate prepolymer having an isocyanate group content of from about 5 to about 29% by weight is formed.

2. The process of claim 1 in which 1 equivalent of organic material (1) is used for every equivalent of monoisocyanate (2) used.

3. The process of claim 1 in which reaction (a) is carried out at a temperature of from about 60° to about 150° C.

4. The process of claim 1 in which reaction (b) is carried out at a temperature of from about 60° to about 120° C.

5. The process of claim 1 in which reaction (c) is carried out at a temperature of from about 40° to about 150° C.

6. The process of claim 1 in which the organic material (1) has two hydroxyl groups.

7. The process of claim 1 in which the monoisocyanate (2) is selected from phenyl isocyanate, dimethylphenyl isocyanate and o-tolyl isocyanate.

8. The process of claim 1 in which zinc acetylacetonate is present during reaction (b).

9. The process of claim 1 in which compound (6) contains at least two isocyanate-reactive groups and has a molecular weight (number average) of from about 1000 to about 8000.

10. The process of claim 1 in which compound (6) is selected from diols, polyols, primary amines, secondary amines and combinations thereof.

11. The product of the process of claim 1.

12. A process for the production of a molded elastomer by a reaction injection molding process comprising a) combining the allophanate-modified prepolymer of MDI produced by the process of claim 1 with an isocyanate-reactive material and b) injecting the mixture made in a) into a mold which is maintained at a temperature of from about 40° to about 80° C. under pressure.

c) allowing the mixture injected in step b) to react, and d) removing the reaction product formed in c) from the mold.

13. The molded elastomer produced by the process of claim 12.

* * * * *